US012079260B2

(12) United States Patent
Chitnis et al.

(10) Patent No.: US 12,079,260 B2
(45) Date of Patent: Sep. 3, 2024

(54) MAINTAINING DIFFERENTIAL PRIVACY FOR DATABASE QUERY RESULTS

(71) Applicant: Apple Inc., Cupertino, CA (US)

(72) Inventors: Mona Chitnis, San Mateo, CA (US); Abhishek Bhowmick, Santa Clara, CA (US); Lucas O. Winstrom, Palo Alto, CA (US); Koray Mancuhan, Cupertino, CA (US); Stephen D. Fleischer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 17/399,030

(22) Filed: Aug. 10, 2021

(65) Prior Publication Data

US 2022/0067075 A1    Mar. 3, 2022

Related U.S. Application Data

(63) Continuation of application No. 16/708,307, filed on Dec. 9, 2019, now Pat. No. 11,086,915.

(51) Int. Cl.
| | |
|---|---|
| *G06F 16/00* | (2019.01) |
| *G06F 16/16* | (2019.01) |
| *G06F 16/33* | (2019.01) |
| *G06F 16/335* | (2019.01) |
| *G06F 16/338* | (2019.01) |
| *G06F 21/62* | (2013.01) |

(52) U.S. Cl.
CPC .......... *G06F 16/335* (2019.01); *G06F 16/168* (2019.01); *G06F 16/3331* (2019.01); *G06F 16/338* (2019.01); *G06F 21/6218* (2013.01)

(58) Field of Classification Search
CPC ..................................................... G06F 16/335
See application file for complete search history.

(56) References Cited

U.S. PATENT DOCUMENTS

| | | | |
|---|---|---|---|
| 2010/0024042 A1* | 1/2010 | Motahari | G06F 21/6263 706/50 |
| 2015/0286827 A1 | 10/2015 | Fawaz | |
| 2018/0349636 A1 | 12/2018 | Bhowmick | |
| 2020/0250335 A1* | 8/2020 | Hockenbrocht | G06F 21/6245 |

* cited by examiner

*Primary Examiner* — Ajith Jacob
(74) *Attorney, Agent, or Firm* — BAKERHOSTETLER (57) ABSTRACT

The subject technology for maintaining differential privacy for database query results receives a query for a database that contains user data. The subject technology determines that the query is permitted for the database based at least in part on a privacy policy associated with the database. The subject technology determines that performing the query will not exceed a query budget for the database. The subject technology, when the query is permitted and performing the query will not exceed the query budget, performs the query on the database and receiving results from the query. The subject technology selects a differential privacy algorithm for the results based at least in part on a query type of the query. The subject technology applies the selected differential privacy algorithm to the results to generate differentially private results. The subject technology provides the differentially private results.

20 Claims, 5 Drawing Sheets

MAINTAINING DIFFERENTIAL PRIVACY FOR DATABASE QUERY RESULTS

CROSS REFERENCE TO RELATED APPLICATIONS

This application is a continuation of U.S. patent application Ser. No. 16/708,307, entitled "MAINTAINING DIFFERENTIAL PRIVACY FOR DATABASE QUERY RESULTS," filed on Dec. 9, 2019, the disclosure of which is hereby incorporated herein in its entirety.

TECHNICAL FIELD

The present description relates generally to providing a database system that incorporates differential privacy.

BACKGROUND

Preserving data privacy is a concern in many business areas, including e-commerce, healthcare, government, and finance, where individuals entrust others with their personal information.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Differential privacy has become an important consideration for service providers that aggregate data/information of users, including sensitive or confidential information. In a client/server environment, differential privacy introduces randomness (e.g., statistical noise generated by a particular differential privacy algorithm) into aggregate user data prior to a server providing the aggregate user data to a client. As more user information is provided, general patterns can emerge, but the aggregate user data provided by any server utilizing differential privacy cannot be attributed to any particular individual. Accordingly, differential privacy can enable insights from large datasets, while ensuring that information about specific users remains private.

Aggregate user data may be considered differentially private when an observer viewing the user data cannot tell if a particular individual's information was included in the user data. For example, differentially private algorithms as described herein can generate statistical noise to include in demographic information or other statistical aggregates of user data to ensure confidentiality of the user data even to analysts (e.g., scientists, engineers, consultants, etc.) that perform query operations on the user data. In this manner, implementations described herein enable user data to be queried in a manner that is safe to publish, view, and/or share with respect to preserving user privacy.

In implementations described herein, a client device can query aggregate user data and receive differentially private user data from any particular server without having the ability to learn/access the underlying aggregate user data. Such implementations provide differential privacy techniques which, when utilized in conjunction with query budgets, can reduce resource requirements while providing provable guarantees regarding privacy and utility/usefulness. Embodiments described herein provide techniques that can be applied to a variety of use cases to enable private/sensitive data of users to be protected when used for statistical analysis. Example use cases include, but are not limited to, studies involving private/sensitive user health data. Such health data can be collected by a user device with the consent of the user. Specific exemplary applications include protection of private/sensitive user data associated with health research or healthcare frameworks. However, it is understood that the techniques and frameworks described herein can have broad application to the protection of user data.

Figure 1:
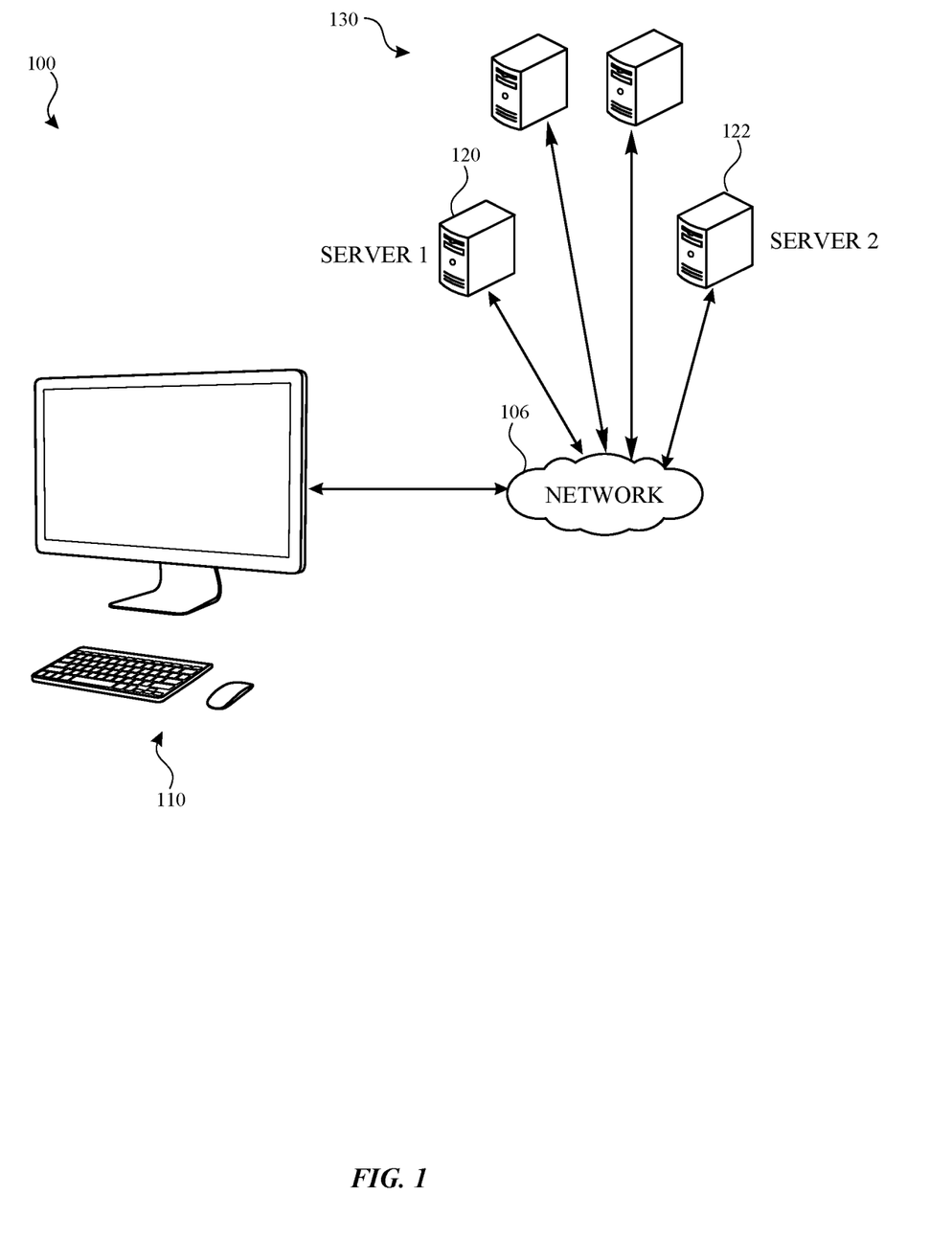
FIG. 1 illustrates an example network environment including an electronic device that may implement the subject system in accordance with one or more implementations.

FIG. 1 illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment 100 may include any number of electronic devices and any number of servers or a data center including multiple servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 5. In one or more implementations, the electronic device 110 may provide a system for receiving input for a database query including keywords and/or operations, and transmitting the database query over the network 106 to the server 120 (or any of the servers in the group of servers 130). Although a single electronic device 110 is illustrated in FIG. 1 for simplicity, it is appreciated that the subject system can support a multitenant environment with multiple electronic devices that submit queries to one or more respective servers from the group of servers 130.

The server 120 and/or the server 122 may be part of a network of computers or the group of servers 130, such as in a cloud computing or data center implementation. The server 120 and/or the server 122 can be any kind of server or a cluster of servers and may include a cloud-based server, application server, backend server, or combination thereof that may be accessible on the electronic device 110. In an implementation, server 120 and/or the server 122 may be isolated from each other and other servers in the group of servers 130 to facilitate confidentiality of user data stored in each of the servers. In an example, each server only stores user data associated with health information for a respective health study, which may only be accessed by analysts assigned to, and/or granted access to, that health study.

The server 120, the server 122, and the group of servers 130 may store user data, such as user data for health information in connection with a health study and/or medical records. In an implementation, although examples described herein relate to health information, the user data can be any form of information such as information related to a user or information related to user actions performed on, and/or in conjunction with, a user device. In an example, the user data can include health data for the user that has been collected by the user device with the consent of the user. Health data can include heart rate information, sleeping information, or other health-related data collected by a user device. The data can also include information such as an activity type performed by a user. For example, an activity type may include running, jogging, biking, etc. As another example, the data may relate to visited websites, words or emojis used by a user, preferences, data from a questionnaire, or any other data that a user may want or request to remain private.

Figure 2:
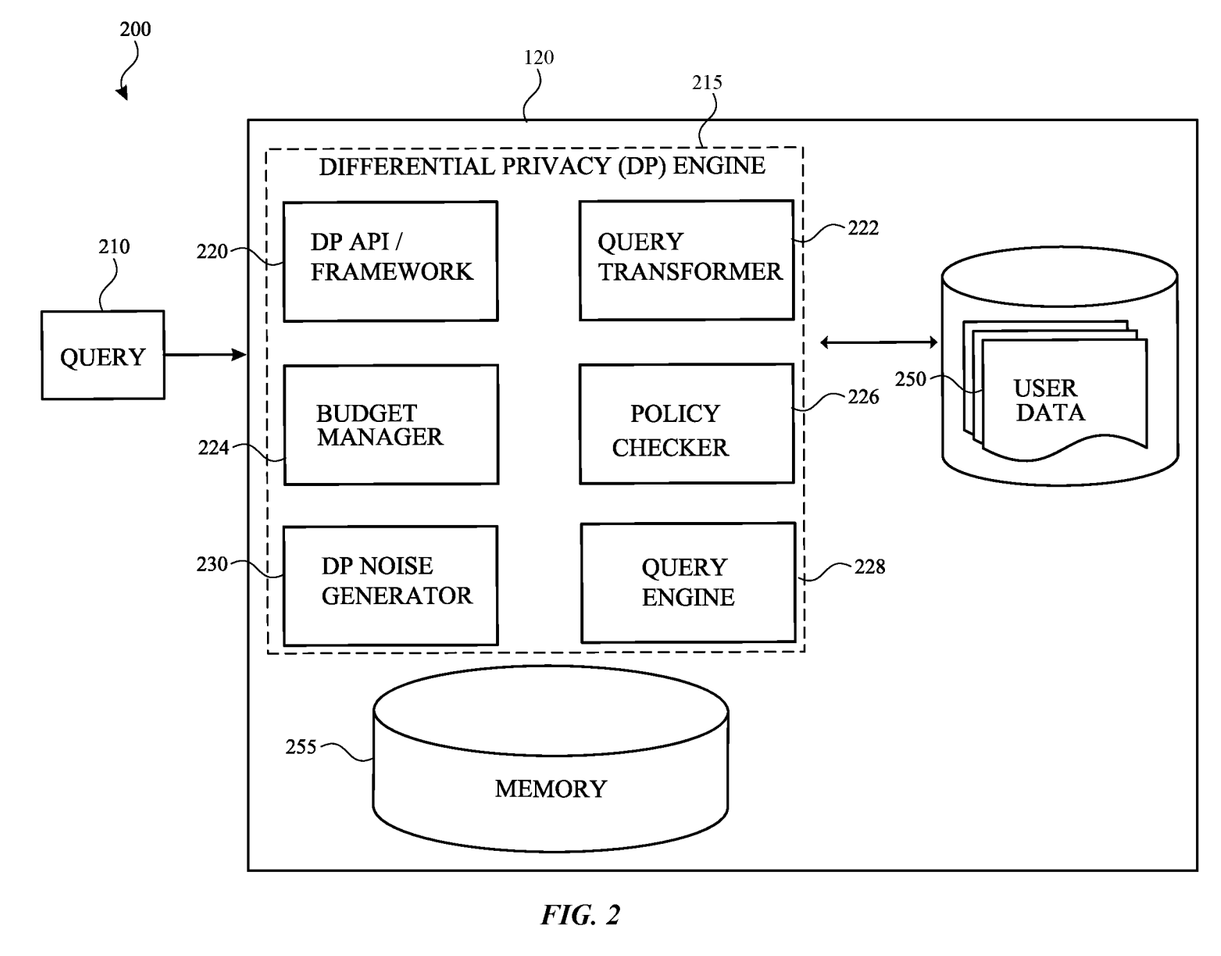
FIG. 2 illustrates an example computing architecture that may be implemented on an electronic device in accordance with one or more implementations.

FIG. 2 illustrates an example computing architecture 200 that may be implemented on the server 120 and/or the server 122 in accordance with one or more implementations. For explanatory purposes, portions of the computing architecture 200 are described as being implemented by the server 120 and the server 122 of FIG. 1, such as by a processor and/or memory of the server 120 and the server 122; however, the computing architecture 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the server 120 includes a differential privacy (DP) engine 215 that includes several components corresponding to a DP application programming interface (API)/framework 220, a query transformer 222, a budget manager 224, a policy checker 226, a query engine 228, and a DP noise generator 230. As further shown, the server 120 includes a memory 255, which could be implemented as any appropriate memory device, and user data 250. In an example, the user data 250 is included in a blob store (e.g., storing encrypted binary data corresponding to large objects or chunks of data) which acts as a storage layer that may be accessed by the query engine 228 when performing queries.

As illustrated, a query 210 can be received by the server 120. In an example, the query 210 can be generated by a user at a given client device, such as the electronic device 110. For instance, the user can create a query using a particular syntax such as a structured query language (SQL) query or write code that process data in different ways. Further, the user can utilize different tools such a query tool with a graphical user interface (GUI) and/or a command line tool for creating a given query. Moreover, the user can be provided with a one or more application programming interfaces (APIs) to enable various function calls, messages, or other types of invocations, which further may include various kinds of parameters, for creating a query for submitting to the server 120. In this example, the DP API/framework 220 can provide an implementation of such APIs to provide one or more sets of functions that can be exposed to third party users (e.g., analysts) to perform queries on the user data 250.

A given user creating a query may be assigned to a particular health study, and in some instances only a single server may store user data associated with the health study. As the location of user data is likely not shared or known by the user creating the query (e.g., due to privacy requirements, etc.), the aforementioned tools and/or APIs can facilitate submission of user created queries to the server 120 when utilized by the user without disclosing the location of such user data.

In an implementation, validation of the query 210 can be performed by the policy checker 226. The policy checker 226 applies a policy based approach to query validation. In an example, the policy checker 226 utilizes a whitelist including a set of queries and/or query types/formats that are permitted to be performed based on a given policy. For example, a whitelist may include portions or particular operations of a set of queries that correspond to aggregate functions such as respective functions for determining the smallest value in a particular column, the largest value in a particular column, the average value in a particular column, the standard deviation of the values in a particular column, the number of values in a particular column, and/or the number of records in the table being searched. In an example, a given aggregate function, when implemented using a SQL syntax, can be utilized with a "GROUP BY" clause of a "SELECT" statement e.g., SELECT columnName, AVG(otherColumnName) FROM tableName GROUP BY columnName.

In contrast, queries that are considered too broad, such as a SQL query that performs a SELECT statement with a star * modifier indicating all columns, are not included in such a whitelist. Other examples of queries that are not included in the whitelist can correspond to a query that is specifically selecting a particular column of data e.g., selection of a column corresponding to heartrate, selection of a column corresponding to a first name, selection of a column corresponding to a last name, etc.

In some instances, the query 210 may be processed by the query transformer 222. The query transformer 222 may transform the query 210 in order to perform a second query to make a determination on whether to permit the query 210 to be submitted to the query engine 228. In an example, for a given query, the query transformer 222 can perform a simple transformation on the query 210 to return a count of rows (e.g., corresponding to a count operator) for the query and then perform the transformed query on the user data 250. If the count of rows is below a particular threshold number, then the original query is not permitted to be performed as the results indicate that the query is too specific. In this instance, no results are returned.

In one or more implementations, the count operator may be required before other aggregate operators (e.g., average, minimum and/or maximum). Moreover, the queries may support filtering, for example, with WHERE predicate clauses with respect to SELECT COUNT(*) as count_users from <table> (e.g., WHERE age >=20 AND age <=30 GROUP BY activity_type). Moreover, the transformed query may be sent to a database in a cloud server (e.g., one or more of the servers in the group of servers 130).

In an implementation, the budget manager 224 may provide a specific query budget for a given health study for performing queries on the user data 250 corresponding to the same health study. If the query budget indicates a sufficient budget for performing the query 210, then the query engine may perform the query 210. The query budget is, in this example, shared among a set of users that are performing queries on the user data 250. In an example, the budget manager can utilize advanced composition techniques to deplete the budget in a nonlinear manner after each query is executed. In particular, the budget manager 224 may not perform a linear depletion of a query budget after each query is performed, instead the query budget is reduced after each query is performed based on a nonlinear function such as a square root of a K number of iterations of performing the query times a weight ε. Moreover, budget manager 224 may replenish the query budget after a period of time thereby enabling the user to perform additional queries on the user data 250. The query budget may be set for a given data set (e.g., health study) such that no individual user can be identified in the data set prior to the depletion of the query budget.

In an example of advanced composition, for all ε, δ, δ'≥0, the class of (ε, δ)-differentially private mechanisms may satisfy (ε', kδ+δ')-differential privacy under k-fold adaptive composition based on Equation (1) as follows:

$$\varepsilon' = \sqrt{2k\ln(1/\delta')}\varepsilon + k\varepsilon(e^{\varepsilon}-1)$$ Equation (1)

For example, the advanced composition may be differentially private, and guarantee at each query that no individual user can be identified prior to exhausting the query budget.

In an example, the budget manager 224 can determine how many resources are utilized in an operation included in the query 210 and whether such an operation is permitted in view of a query budget. Such a query budget, in this example, may correspond to an amount of time allotted for performing queries to ensure privacy of an individual(s) and/or based on computational metrics such as CPU and/or memory utilization, etc. If the query budget is not sufficient for performing the query 210, then no results are returned.

Alternatively, if the query budget indicates a sufficient budget for performing the query 210, then the query engine may perform the query 210.

The query engine 228, as mentioned above, can receive the query 210 and perform the query on a database including the user data 250. A set of results from the query 210 can be received by the query engine 228. In an implementation, the results can be stored in the memory 255. Depending on the type of query (e.g., based on the query operation) corresponding to the query 210, the DP noise generator 230 can select a particular differential privacy algorithm to privatize the set of results by including statistical noise in the set of results (e.g., one or more of a Gaussian noise transform and/or a Laplace transform may be used to add statistically calibrated noise). For example, a first differential privacy algorithm may be selected for a query operation for a count, another type of differential privacy algorithm may be selected for a query operation for an average, and yet another type of differential privacy algorithm may be selected for a query operation for a GROUP BY operation. In an implementation, an amount of statistical noise generated by the DP noise generator 230 can be based on the type of query and the available query budget. After the noise is generated and included in the set of results, the budget manager 224 can reduce the query budget. The DP API/framework 220 can provide the set of results with the noise to the electronic device 110 that originally sent the query 210.

In one or more implementations, the architecture 200 may provide for submitting queries (e.g., arbitrary queries) against a database (e.g., associated with one or more of the servers in the group of servers 130) that contains data that needs to be kept private, but which may be monitored continuously for data integrity and sanity checks. The architecture 200 may provide for automating such submissions, and allowing the monitoring of data without sharing individual data. In addition, the architecture 200 may show aggregate data (e.g., in dashboards) with differential privacy guarantees so that virtually any level of privacy may be tuned for a particular system and use case.

In one or more implementations, the architecture 200 may provide for one or more of: scalable technologies, for example, in which a distributed file system or database operates against users data and storing privatized results; scalable technologies, for example, including a distributed query engine to perform SQL query execution (e.g., to support a wide variety of datasets, varying in size and structure); and/or query analysis which performs automatic inference of schema of structured data at run-time, when data is stored in supported file-formats (e.g., associated with enable low maintenance of any metadata, where data can change and evolve without any changes to system, and performance optimizations with columnar file formats).

Figure 3:
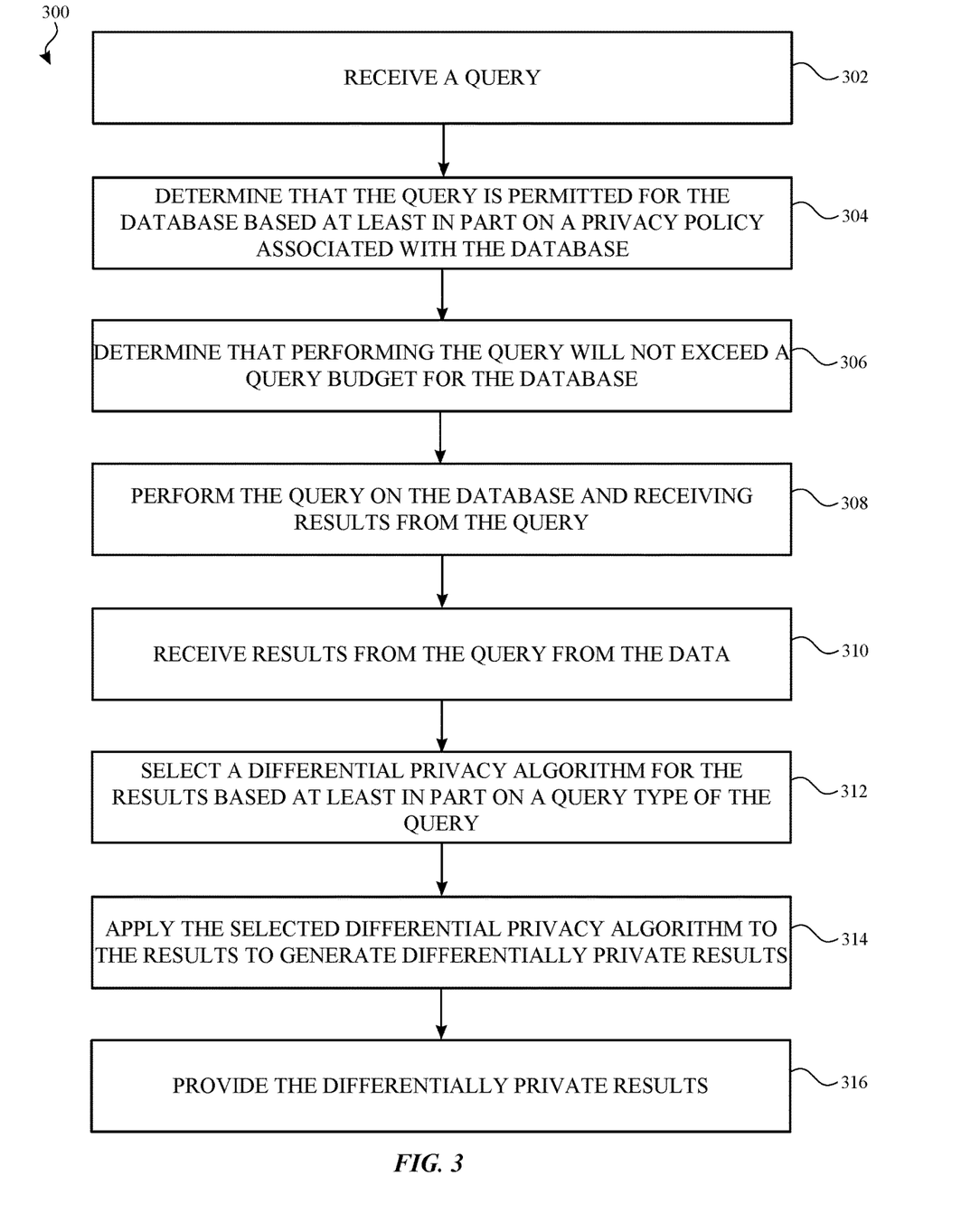
FIG. 3 illustrates a flow diagram of an example process for performing a query and providing a set of privatized results using differential privacy.

FIG. 3 illustrates a flow diagram of an example process 300 for performing a query and providing a set of privatized results using differential privacy in accordance with one or more implementations. For explanatory purposes, the process 300 is primarily described herein with reference to the server 120 of FIG. 1, particularly with reference to the components described above in FIG. 2. However, the process 300 is not limited to the server 120 of FIG. 1, and one or more blocks (or operations) of the process 300 may be performed by one or more other components of other suitable devices. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

Figure 4:
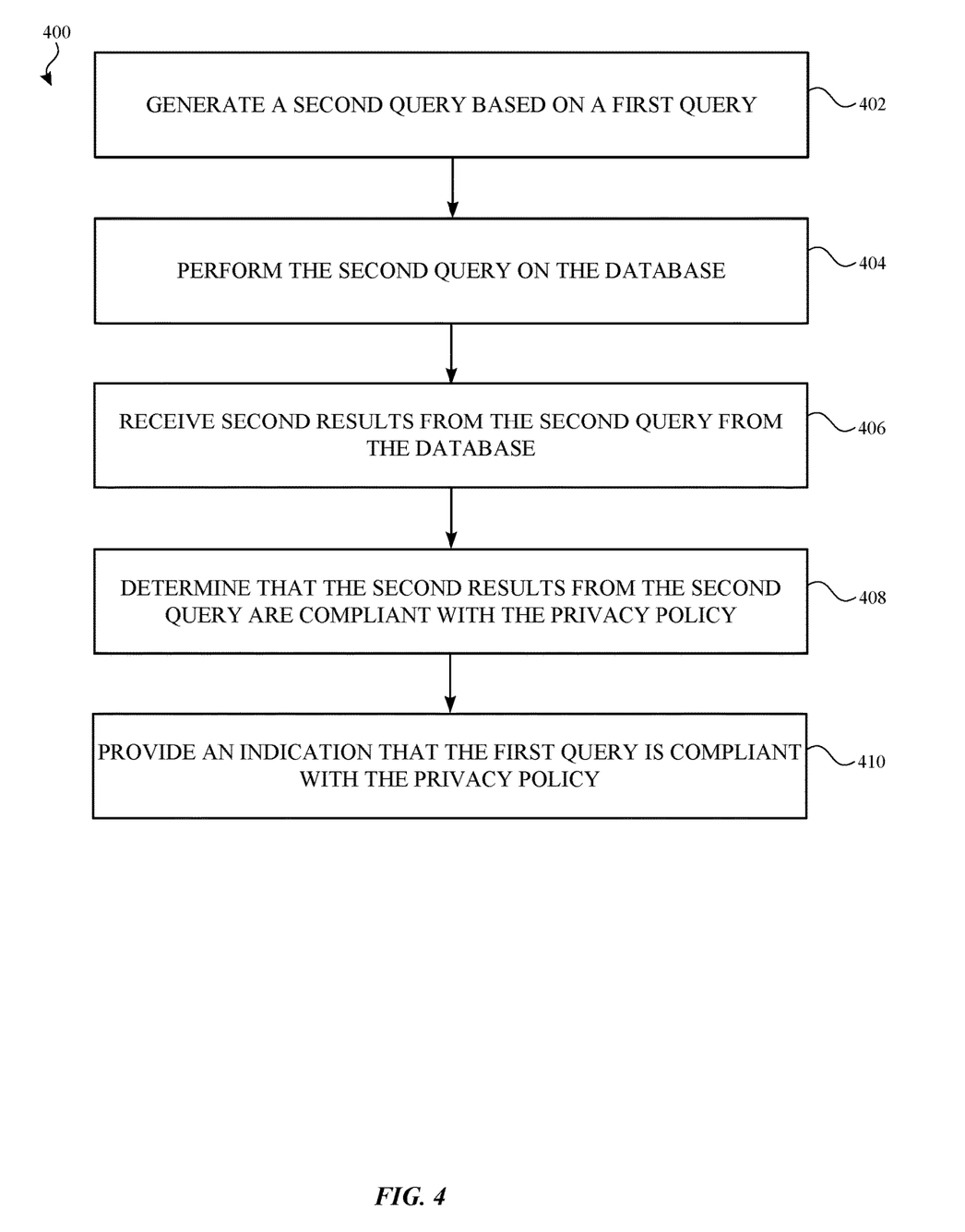
FIG. 4 illustrates a flow diagram of an example process for transforming a query in order to determine compliance with a privacy policy.

The DP API/framework 220 receives a query for a database, the database comprising user data (302). The policy checker 226 determines that the query is permitted for the database based at least in part on a privacy policy associated with the database (304). In one or more implementations, the policy checker 226 may perform the process 400 below to determine whether the query is permitted under the privacy policy. The budget manager 224 determines that performing the query will not exceed a query budget for the database, the query budget being depleted based at least in part on a number of queries performed on the database (306). The query engine 228, when the query is permitted and performing the query will not exceed the query budget, performs the query on the database and receiving results from the query (308). The query engine 228 receives results from the query from the database (310). The DP noise generator 230 selects a differential privacy algorithm for the results based at least in part on a query type of the query (312). The DP noise generator 230 applies the selected differential privacy algorithm to the results to generate differentially private results (314). The DP API/framework 220 provides the differentially private results (316).

FIG. 4 illustrates a flow diagram of an example process 400 for transforming a query in order to determine compliance with a privacy policy in accordance with one or more implementations. For explanatory purposes, the process 400 is primarily described herein with reference to the server 120 of FIG. 1, particularly with reference to the components described above in FIG. 2. However, the process 400 is not limited to the server 120 of FIG. 1, and one or more blocks (or operations) of the process 400 may be performed by one or more other components of other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The query transformer 222 generates a second query based on a first query (402). The query transformer 222 performs the second query on the database. The query transformer 222 receives second results from the second query from the database. The query transformer 222 determines that the second results from the second query are compliant with the privacy policy based at least in part on whether the second results include information that correspond to a threshold number of individuals. In one or more implementations, the second results from the second query may be compliant with the privacy policy when the second results include information from a number of individuals that exceeds a threshold number. The query transformer 222 provides an indication that the first query is compliant with the privacy policy (410).

Figure 5:
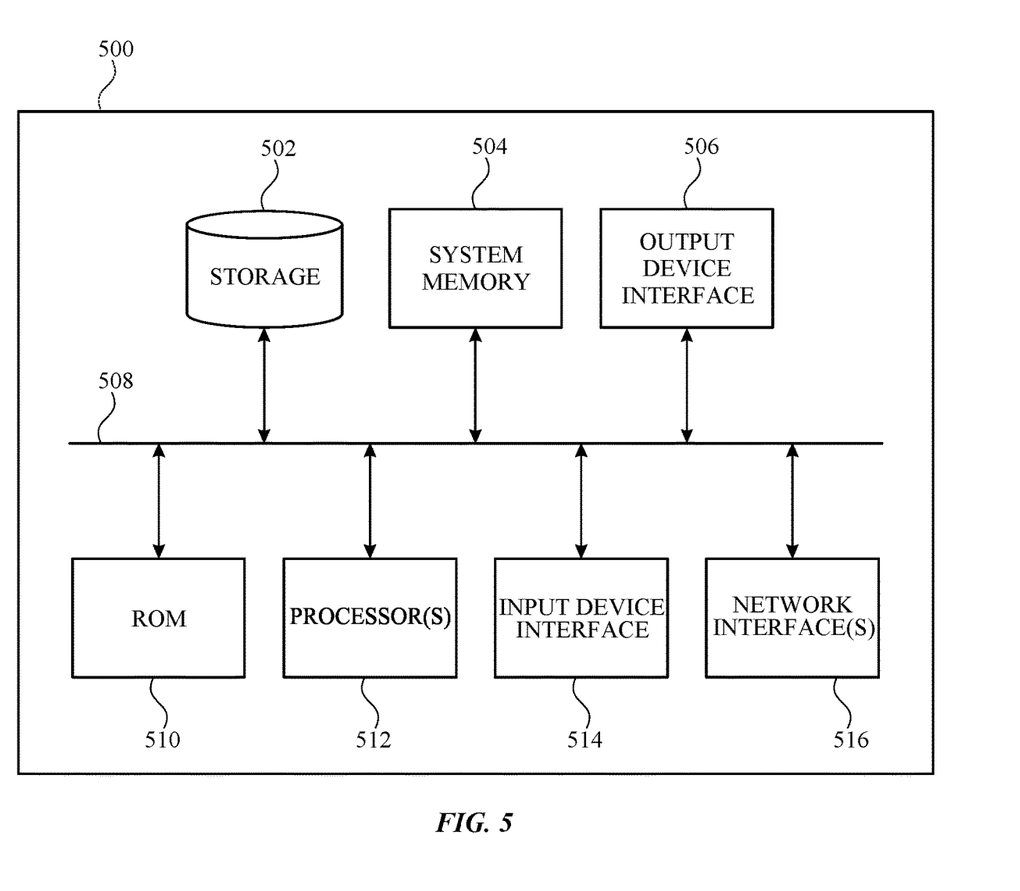
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, the electronic device 110, and/or the server 120 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the electronic device 110 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving a query for a database, the database comprising user data;
determining that the query is permitted for the database based at least in part on a privacy policy associated with the database, the determining comprising transforming the query into a second query and determining whether second query results of the second query include information that corresponds to a threshold number of individuals;
determining that performing the query will not exceed a query budget for the database, the query budget being depleted based at least in part on a number of queries performed on the database; and
when the query is permitted and performing the query will not exceed the query budget, performing the query on the database and providing results from the query.

2. The method of claim 1, wherein providing the results from the query comprises:
selecting a differential privacy algorithm for the results based at least in part on a query type of the query;
applying the selected differential privacy algorithm to the results to generate differentially private results; and
providing the differentially private results.

3. The method of claim 2, wherein generating differentially private results is based on a type of query corresponding to the received query.

4. The method of claim 3, wherein the type of query includes an operation, the operation comprising one of a sum, count, maximum, average, median, or histogram.

5. The method of claim 1, wherein determining that the query is permitted under the privacy policy further comprises:
generating the second query based on the query;
performing the second query on the database;
receiving the second query results from the second query from the database; and
determining that the second query results from the second query are compliant with the privacy policy based at least in part on whether the second query results include information that corresponds to the threshold number of individuals.

6. The method of claim 5, wherein the number of individuals are greater than a threshold number indicating that the second query results are compliant with the privacy policy.

7. The method of claim 1, wherein determining that the query can be performed based on the query budget further comprises:
receiving the query budget corresponding to at least a number of queries that are allowed to be performed on the database during a period of time;
determining a current query budget based at least in part on a number of previous queries performed during the period of time;
determining that the query can be performed based on the current query budget; and
adjusting the current query budget based on a budget cost associated with performing the query.

8. The method of claim 7, wherein the query budget further corresponds to particular types of operations performed on the database, and each type of operation is associated with a respective cost for performing each type of operation.

9. The method of claim 7, wherein the period of time corresponds to a duration of a healthcare study.

10. The method of claim 1, wherein the query is received from a graphical user interface (GUI) tool or a command line interface (CLI) tool.

11. The method of claim 1, wherein the database includes health information.

12. A system comprising;
a processor; and
a memory device containing instructions, which when executed by the processor cause the processor to:
receive a query for a database, the database comprising user data;
determine that the query is permitted for the database based at least in part on a privacy policy associated with the database, the determine comprising generating a second query from the query and determining whether second query results of the second query will include information that corresponds to a threshold number of individuals;
when the query is permitted, performing the query on the database and receiving results from the query;
select a differential privacy algorithm for the results based at least in part on a query type of the query;
apply the selected differential privacy algorithm to the results to generate differentially private results; and
provide the differentially private results.

13. The system of claim 12, wherein to determine that the query is permitted under the privacy policy further causes the processor to:
perform the second query on the database;
receive the second query results from the second query from the database; and
determine that the second query results from the second query are compliant with the privacy policy based at least in part on whether the second query results include information that corresponds to the threshold number of individuals.

14. The system of claim 13, wherein the number of individuals are greater than a threshold number indicating that the second query results are compliant with the privacy policy.

15. The system of claim 12, wherein the query is received from a graphical user interface (GUI) tool or a command line interface (CLI) tool.

16. The system of claim 12, wherein to generate differential privacy information is based on a type of query corresponding to the received query.

17. The system of claim 16, wherein the type of query includes an operation, the operation comprising one of a sum, count, maximum, average, median, or histogram.

18. A non-transitory computer-readable medium comprising instructions, which when executed by a computing device, cause the computing device to perform operations comprising:
receiving a query for a database, the database comprising user data;
determining that the query is permitted for the database based at least in part on a privacy policy associated with the database, the determining comprising transforming the query into a second query and determining whether second query results of the second query will include information that corresponds to a threshold number of individuals;

determining that performing the query will not exceed a query budget for the database, the query budget being depleted based at least in part on a number of queries performed on the database; and when the query will not exceed the query budget, performing the query on the database and providing results from the query.

19. The non-transitory computer-readable medium of claim 18, wherein providing the results from the query comprises:

selecting a differential privacy algorithm for the results based at least in part on a query type of the query;

applying the selected differential privacy algorithm to the results to generate differentially private results; and providing the differentially private results.

20. The non-transitory computer-readable medium of claim 18, wherein the database includes health information.

* * * * *

UNITED STATES PATENT AND TRADEMARK OFFICE
CERTIFICATE OF CORRECTION

| | | |
|---|---|---|
| PATENT NO. | : 12,079,260 B2 | Page 1 of 1 |
| APPLICATION NO. | : 17/399030 | |
| DATED | : September 3, 2024 | |
| INVENTOR(S) | : Mona Chitnis et al. | |

It is certified that error appears in the above-identified patent and that said Letters Patent is hereby corrected as shown below:

In the Claims

Column 14; Line 26 (Claim 12): "will include" should read --include--;

Column 15; Line 2 (Claim 18): "query will include" should read --query include--.

Signed and Sealed this
Twenty-sixth Day of November, 2024

Katherine Kelly Vidal
*Director of the United States Patent and Trademark Office*